Jan. 11, 1966 P. TABER 3,228,275
PUNCH AND DIE ASSEMBLY
Filed April 22, 1963 2 Sheets-Sheet 1

INVENTOR
PHILIP TABER
BY
Nolte & Nolte
ATTORNEYS

Jan. 11, 1966  P. TABER  3,228,275
PUNCH AND DIE ASSEMBLY
Filed April 22, 1963  2 Sheets-Sheet 2
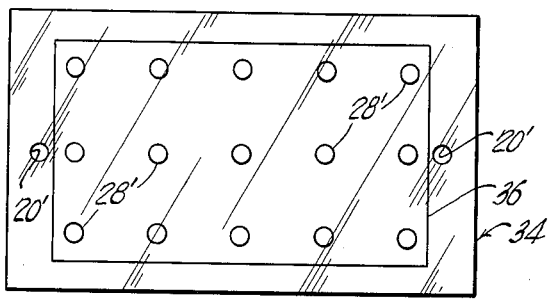
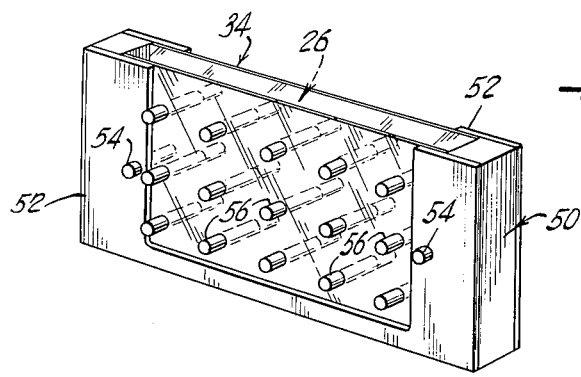
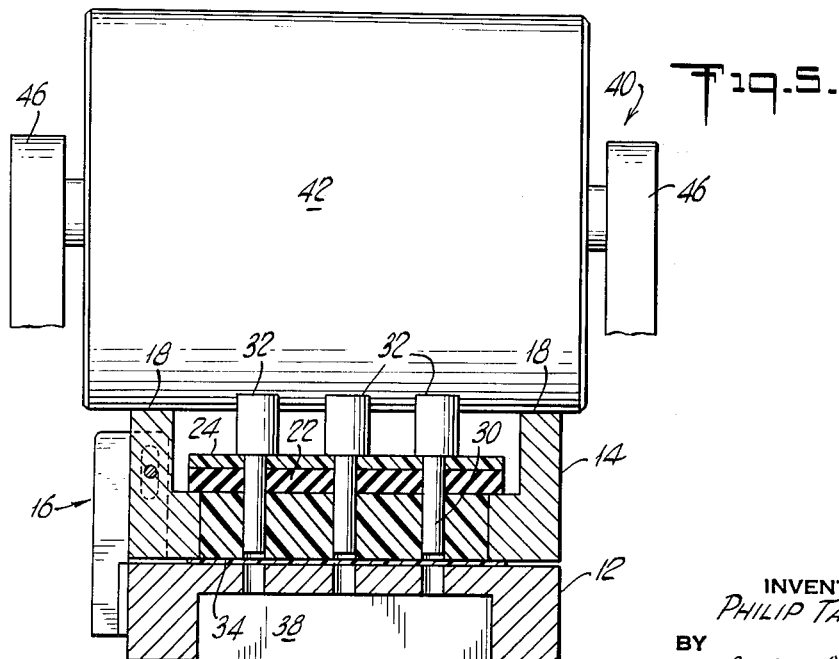
INVENTOR
PHILIP TABER
BY
Nolte & Nolte
ATTORNEYS …

United States Patent Office 3,228,275
Patented Jan. 11, 1966

3,228,275
PUNCH AND DIE ASSEMBLY
Philip Taber, Nonquitt, South Dartmouth, Mass., assignor to Philip Taber, Thayer Francis, Jr., and Samuel A. Francis, as trustees of Engineers Trust
Filed Apr. 22, 1963, Ser. No. 274,492
5 Claims. (Cl. 83—588)

This invention relates to punch and die assemblies in general, and in particular to an improved construction and method for making and actuating a multiple aperture punch and die assembly.

The present invention is particularly useful in punching a plurality of spaced apertures in thin films of insulation material which are subsequently used to space electrical components in high density electronic modules, such as shown in, for instance, U.S. Letters Patent No. 2,911,572 issued November 3, 1959. In the fabrication of insulation films which range in dimension from .005 to .010 inch thickness, it is conventional to photographically reproduce the desired aperture positions onto the insulation film. Thereafter the film was manually positioned relative to a single aperture punch assembly and each of the required apertures were individually fabricated. Obviously this mode of fabrication is costly and time consuming and subject to human error in mislocating the apertures from their desired positions.

While it is well known to punch a plurality of holes at the same time with a multiple aperture punch and die assembly, the known prior art constructions are costly to fabricate and may usually only be justified when high volume production runs are anticipated.

The present invention provides a simple, low cost punch and die assembly of unique construction which is highly flexible in application and readily adaptable to the various patterns of apertures desired in the insulation film to be punched. One particularly novel feature of the present invention is its arrangement which permits the entire assembly to be passed beneath an anvil roller to sequentially actuate the plurality of individually movable punches therein which are subsequently returned or withdrawn from the die by a resilient pad placed under the enlarged head portion of each punch.

The novel method employed to fabricate the punch guide block includes employing a pair of spaced accurately hand punched films having dowel pins extending through their apertures as a mold therefor. The mold so formed is filled with a suitable material such as epoxy resin to produce a block having punch guide apertures therein in conformity to the apertures in the insulation film. The punch guide block so formed when oriented with respect to the die block is employed as a drill jig for forming die apertures corresponding in location to the apertures in the guide block. In this way the costly jig boring operation normally used to form one or both of the punch and die halves is avoided.

Accordingly, it is an object of the present invention to provide an improved low cost punch and die assembly.

Another object of the invention is to provide an improved method for fabricating a punch and die assembly of the character described.

Another object of the invention is to provide an improved punch and die assembly and means for operation thereof.

Another object of the invention is to provide a unique punch assembly configuration which permits the easy sharpening of the punch ends should they become dulled through use without affecting their operating stroke.

These and other objects and advantages of the invention will become apparent and the invention will be fully understood from the following description and drawings, in which:

FIG. 3 shows a typical insulation film indicating the apertures to be placed therein by the punch and die assembly;

FIG. 4 is a perspective view of the mold employed in the novel method of making the punch guide block; and FIG. 5 is a cross sectional view of the invention as taken along line 5—5 of FIG. 2.

It will be understood that the drawings illustrate a preferred embodiment of the invention and that other embodiments are contemplated within the scope of the claims hereafter set forth.

Figure 1:
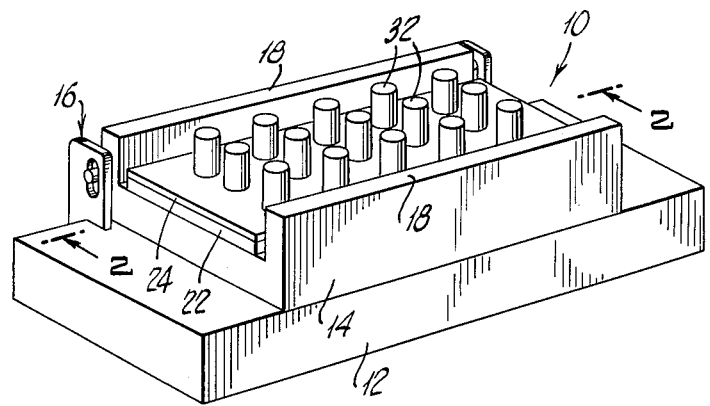
FIG. 1 is a perspective view of the punch and die assembly of the invention.
Figure 2:
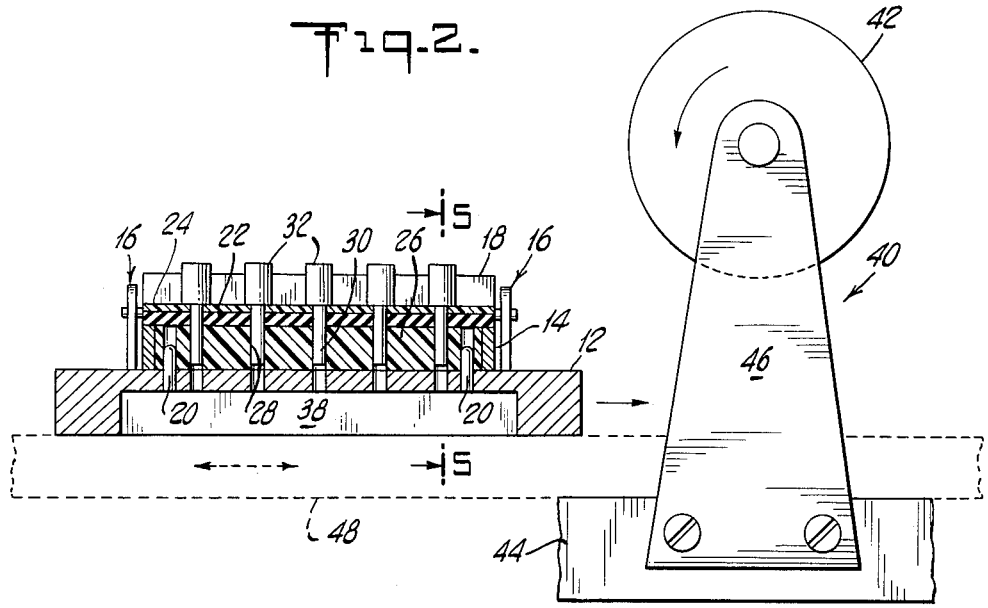
FIG. 2 shows the punch and die assembly of FIG. 1 in cross section taken along line 2—2 thereof as it would be used in combination with a roller punch actuating means.

A multiple aperture punch and die assembly generally indicated at 10 includes a lower die portion 12 and an upper punch portion 14 connected by a hinge assembly 16. The upper punch portion 14 includes a pair of raised upstanding ribs 18, 18 which serve to limit the amount of downward stroke imparted to the punches 30 in a manner described more fully hereafter. The die portion 12 includes a pair of spaced upstanding pins 20 which engage corresponding apertures in a punch guide block 26 secured in the punch portion thereby to accurately align the two halves of the punch and die assembly. The pins 20 pass through pre-punched apertures 20′ in the sheet of insulation material 34 to thereby accurately align the unpunched sheet relative to the die assembly 12. For purposes of clarity the insulation 34 has not been shown between the punch and die portions of FIG. 2, but is shown in enlarged scale in FIG. 5.

The upper punch portion 14 includes a guide block 26 which may be made of a suitable epoxy resin and is formed with a plurality of spaced parallel apertures 28 extending therethrough by a novel method later described. Passing through each of the apertures 28 is a punch 30 whose lower end does not normally protrude beneath the lower surface of the block 26. Each punch 30 includes an enlarged upper head portion 32 in contact with a protective sheet 24 of relatively hard and flexible plastic material such as Mylar. A relatively thick sheet 22 of resilient material such as rubber is spaced between the protective sheet 24 and the upper surface of the block 26 to act as a compression spring for maintaining the punches 30 in their normal uppermost position as shown.

Referring to FIG. 3 a sheet 34 of insulating material is illustrated having pre-punched apertures 20′ for engaging the upstanding pins 20 to accurately locate the sheet 34 in the punch. The circles designated 28′ indicate the location and size of the apertures that will be placed in the sheet 34 by the operation of the punch and die. The rectangular outline 36 is illustrative of the smaller peripheral dimension to which the sheet 34 may be subsequently trimmed for use in an electronic assembly.

In the operation of the invention a sheet 34 is placed over the pins 20 and between the punch and die portions 14 and 12. Thereafter in the preferred method of punch actuation the entire assembly is positioned upon a transfer plate 48 which is adapted to be horizontally translated through the punch operating mechanism shown generally at 40 (see FIG. 2). The mechanism 40 includes a rotatably mounted anvil cylinder 42 supported by the spaced brackets 46 to a base plate 44. As the punch and die assembly is advanced under the cylinder 42, a progressive depression of each head portion 32 occurs to a level coincident with the top level of the upstanding ribs 18 until each of the punches 30 has been projected downwardly through the thickness of the sheet 34 and into the corresponding apertures in the die portion 12. The rotational axis of the anvil cylinder 42 may be, if desired, allowed to move vertically of the table 44 in which case it would be biased downwardly by spring means (not shown). A die cavity 38 beneath each of the die apertures provides sufficient space for the removed portions of the sheet and reduces the amount of back pressure resulting from an accumulation of the punched out portions of the sheet in the die aperture if it were to extend to the lowermost surface of the die 12. During passage of each transverse row of punches under the impression roller 42, the resilient rubber layer 22 is compressed under the enlarged punch head portion 32. This compressed sheet 22 thereafter acts to provide the necessary upward force to return the punch 30 to its normal uppermost position after passage underneath the anvil cylinder 42. The protective sheet 24 serves to distribute the compressive load upon the resilient sheet 22 and to lengthen its usable operating life.

In the preferred embodiment shown, a novel low cost method of fabrication is employed which makes use of two accurately hand punched sheets of insulating film 34 as the end walls for the mold in which guide block 26 is formed.

Referring to FIG. 4 the punch guide block mold 50 includes two side plates 52, 52 having apertures therein for engaging a pair of mold pins 54. Each of the pins 54 engages the aperture 20' in the ends of the spaced films 34 and serve to accurately locate the apertures 28' transversely of the correspondingly punched apertures in the adjacent sheet 34. Thereafter a plurality of core pins 56 are inserted through the apertures 28' and across the interior portion between the spaced sheets 34, 34. Each of the insulation films 34 is represented as being transparent in FIG. 4 for purposes of illustration to show the pins passing therethrough. With the guide block mold thus formed the void between films 34 is filled with a suitable epoxy resin. Upon the solidification of the resin the mold 50 is disassembled and the pins 56 and sheets 34 are removed to form a guide block 26 for mounting in the punch portion 14 with the desired apertures therethrough for receiving punches 30. Thereafter, the punch portion 14 thus formed using the manually punched films 34 as molding templates, may be secured to a non-apertured die portion 12 and employed as a drill jig for drilling corresponding apertures therein. With this novel method of punch and die fabrication, applicant has drastically reduced the machining and labor cost normally associated with the construction of a similar aperture die assembly by conventional techniques.

Because the multiple aperture punch of the present invention is constructed and arranged in the manner described, each of the individually movable pins is self-aligning with respect to its associated aperture. Accordingly, cumulative tolerance build up problems associated with punches having each pin rigidly connected to one another are not encountered. The invention is in effect an integrated assembly of low cost individual aperture punches which co-operate to yield all the production economies of conventional gang punches without their associated high cost and tight tolerance considerations.

Another feature of applicant's novel arrangement is the ease and economy of sharpening the punches should they become dull. The lower ends of the punches 30 need only be reground and a corresponding amount of material removed from the upper surfaces of ribs 18 to effect a sharpening of the punch assembly without changing the effective punch stroke. A corresponding sharpening of the die portion 12 may be accomplished by the mere resurfacing of its upper surface, as by grinding.

Applicant's invention is extremely flexible and may be adapted to a multiplicity of different aperture patterns by providing in the punch and die an excess of apertures 28 at all the potentially desired locations. Thereafter should certain apertures not be required the corresponding punch 30 may be merely removed from the aperture to prevent fabrication of the undesired holes.

While applicant has described his invention as particularly useful in fabricating a plurality of apertures in a sheet of insulating material of a certain thickness range, those skilled in the art will readily appreciate that the invention may be used to punch sheets of different material compositions and thicknesses from those specified.

Those skilled in the art will also readily appreciate that the individually movable punches may be actuated more or less simultaneously in a conventional press means in lieu of the progressive roller actuation disclosed.

While a specific embodiment of the invention has been shown and described in detail to illustrate the application of the inventive principles, it will be understood that the invention may be embodied otherwise without departing from such principles.

What I claim is:

1. A punch and die assembly comprising a die portion consisting of a one-piece body having a plurality of apertures therein, and a punch portion cooperating with said die portion and consisting of a one-piece non-metallic body, said punch portion including an exterior surface, a plurality of axially and independently movable pins extending through apertures in said punch portion arranged to fit into said die portion apertures, the upper ends of said pins extending above said exterior surface, and means for biasing said pins, said pins including an enlarged diameter upper end portion and said biasing means including a pad of resilient material between said exterior surface and the enlarged end portion.

2. In combination the punch and die assembly of claim 1 and roller means for sequentially extending each of said pins into the apertures of said die portion by the depression of said pin enlarged upper end.

3. A punch and die assembly comprising a die portion having a plurality of apertures therein, a punch portion of predetermined thickness having a part formed with a plurality of apertures in registry and in axial alignment with said die portion apertures, a plurality of pins engaging the apertures of said punch portion, each of said pins being of a length greater than the predetermined thickness of said punch portion and being axially movable in its respective aperture independent of movement of the remaining pins, and means for normally holding an end of each of said pins outwardly of an exterior surface of said punch portion having an elevation higher than said part of said punch portion whereby subsequent alignment of each pin end with said exterior surface is effective to project the opposite end of the pin outwardly of the opposite exterior surface of said punch portion, means for hingedly connecting the punch portion to said die portion, and said pins, including an enlarged upper end portion, said holding means including a resilient sheet member disposed between the enlarged upper end portion of said pins and a recessed surface portion of said punch portion.

4. A punch and die assembly comprising a die portion having a plurality of apertures therein, a punch portion, said punch portion including a recessed central portion having a plurality of apertures therethrough in registry and in axial alignment with said die portion apertures and raised guideways of predetermined thickness adjacent said central portion, a plurality of pins engaging the apertures of said punch portion, each of said pins being of a length greater than the thickness of said punch portion through said guideways and being axially movable in its respective aperture independent of movement of the remaining pins, and resilient bias means for normally holding an end of each of said pins outwardly of an exterior surface of said guideways whereby subsequent alignment of each pin end with said exterior surface is effective to project the opposite end of the pin outwardly of the opposite exterior surface of said punch portion, said pins each including an enlarged upper end portion, and said resilient bias means including a sheet member disposed in said recessed central portion beneath said upper end portions.

5. A punch and die assembly comprising a die portion consisting of a one-piece body having a plurality of apertures therein, and a punch portion cooperative with said die portion and consisting of a one-piece non-metallic body, said punch portion including an exterior surface, a plurality of axially and independently movable pins extending through apertures in said punch portion arranged to fit in said die portion apertures, the upper ends of said pins extending above said exterior surface, and means for biasing said pins, said pins including an enlarged diameter upper end portion and said biasing means being situated exclusively between said exterior surface and the enlarged end portion.

References Cited by the Examiner
UNITED STATES PATENTS

| | | | |
|---|---|---|---|
| 141,629 | 8/1873 | Clark | 83—618 |
| 1,726,219 | 8/1929 | Gammeter | 83—618 |
| 1,964,752 | 7/1934 | Wales | 83—588 |
| 2,379,003 | 6/1945 | Hedberg | 83—620 |
| 2,660,245 | 11/1953 | Marsh | 83—588 |
| 3,059,506 | 10/1962 | Linzell | 76—107 |
| 3,077,807 | 2/1963 | Wright | 83—563 |
| 3,080,776 | 3/1963 | Muenchinger | 76—107 |
| 3,087,367 | 4/1963 | Semler | 83—588 |

ANDREW R. JUHASZ, *Examiner.*
WILLIAM W. DYER, JR., *Primary Examiner.*